United States Patent [19]
Michel et al.

[11] 3,878,130

[45] Apr. 15, 1975

[54] CATALYTICALLY ACTIVE SUBSTANCE FOR THE CONVERSION OF HIGHER HYDROCARBONS COMPRISING CO, LA, NI, AND U

[75] Inventors: Alfred Michel; Christian Koch, both of Erlangen, Germany

[73] Assignee: Siemens Aktiengesellschaft, Munich, Germany

[22] Filed: Feb. 22, 1973

[21] Appl. No.: 334,932

[30] Foreign Application Priority Data
Mar. 3, 1972 Germany............................ 2210365

[52] U.S. Cl. ............... 252/458; 252/465; 252/472; 423/213
[51] Int. Cl. ....................... B01j 11/06; B01j 11/32
[58] Field of Search...................... 252/458, 465, 472

[56] References Cited
UNITED STATES PATENTS 3,542,842 11/1970 Grasselli et al. ................ 252/458 X
3,645,915 2/1972 Stiles.............................. 252/458 X

*Primary Examiner*—Paul F. Shaver
*Attorney, Agent, or Firm*—Kenyon & Kenyon Reilly Carr & Chapin

[57] ABSTRACT

This invention relates to a catalytically active substance for the conversion of higher hydrocarbons into gas mixtures, such as those containing carbon monoxide, methane and/or hydrogen, for use in combustion engines, such as the internal combustion engine of an automobile. The catalytically active substance uses a catalyst comprised of oxides of the metals lanthanum, cobalt, nickel and uranium; and an oxidic catalyst carrier for this catalyst. The carrier comprises a metal oxide selected from the group consisting of aluminum oxide, magnesium oxide, silicon oxide, zirconium oxide and titanium oxide. Preferably, the carrier is in the form of one or more porous sintered blocks on which the catalyst has been impregnated.

38 Claims, 2 Drawing Figures

3,878,130

3,878,130

CATALYTICALLY ACTIVE SUBSTANCE FOR THE CONVERSION OF HIGHER HYDROCARBONS COMPRISING CO, LA, NI, AND U

BACKGROUND OF THE INVENTION

1. Field of the Invention

This invention relates to gas mixtures which are used for the operation of combustion engines, such as those in automobiles, and, more particularly, to a catalytically active substance for the conversion of higher hydrocarbons into gas mixtures which contain carbon monoxide, methane and/or hydrogen.

2. Description of the Prior Art

There are other processes known in the prior art for the conversion of hydrocarbon into gas mxtures which contain carbon monoxide, methane and/or hydrogen and which are used for the operation of combustion engines. Such prior art processes are disclosed in German Patent Applications No. P 21 03 008.0 and No. P 21 35 650.3. In these prior art processes, the fuel which is used is low in noxious substances and oxygen-containing gas is added for rust-free conversion. The fuel is conducted at elevated temperatures over the catalyst for conversion into the gas mixture. Air is added to the gas mixture obtained during this conversion and then the gas mixture is conducted to the engine for combustion. Plain distillate benzine having a low octane number is used, for example, as the fuel and nickel, platinum or a nickel-platinum mixture is used as the catalyst for the conversion in these prior art processes. The catalyst is provided on a catalyst-carrier.

The gas mixture produced by such prior art processes contains carbon monoxide, methane and hydrogen. Such a gas mixture burns more rapidly and more completely than higher hydrocarbons in an engine, such as a four-cycle engine. The emission of noxious substances in the exhaust is diminished substantially because of this more rapid and complete combustion. The oxygen needed for the conversion of the higher hydrocarbons comes from the air. This air may, at least in part, be replaced by exhaust gas from the engine, which contains oxygen, for example, in the form of carbon dioxide $CO_2$ and water vapor $H_2O$. The composition of the gas mixture obtained during the conversion of the higher hydrocarbons can be altered by changing the catalyst temperature. The term "higher hydrocarbons" in this description means hydrocarbons having two or more carbon atoms and, in particular, hydrocarbons having more than four carbon atoms.

There are many requirements for catalytically active substances used in such processes. They should have high mechanical stability and high heat stability. They should cause only a small loss of pressure. They should accelerate specifically the reaction rate of the conversion reaction. Finally, they should retain their catalytic activity over a long period of time, both in an oxidizing atmosphere and in a reducing atmosphere.

The prior art catalysts used in these processes, or in a device for carrying out such processes, do not meet all of the foregoing requirements. In particular, they do not meet the stringent requirement for stability under temperature variations and stability under varying reaction conditions. For example, under reaction conditions of rapid temperature variations at the catalyst and the alternating occurrence of oxidizing and reducing reaction conditions, nickel catalysts weaken in catalytic activity over a long term of use and platinum catalysts have the disadvantage of being expensive. Since the natural occurrence of platinum is relatively rare, this poses a problem in using platinum in cracking carburetors, which is the name of the part of the apparatus in which the conversion of hydrocarbons is done, because of the considerably large number of such units necessary when used in automobiles.

SUMMARY OF THE INVENTION

The major object of this invention is to provide an improved catalytic substance for the conversion of higher hydrocarbons, in particular for the conversion of higher hydrocarbons into gas mixtures containing carbon monoxide, methane and/or hydrogen. Such gas mixtures as useful, for example, in the operation of automobile engines. Another object is to provide a catalytically active substance which has improved catalytic activity and increased activity life. Another object is to provide a catalytically active substance which is inexpensive to produce and which can be produced from readily available metal, that is, without requiring noble metals.

According to this invention, the catalytically active substance for the conversion of higher hydrocarbons into gas mixtures, such as gas mixtures containing carbon monoxide, methane and/or hydrogen, comprises: a catalyst comprising oxides of the metals lanthanum, cobalt, nickel and uranium; and an oxidic catalyst carrier for this catalyst. The catalyst includes a mixture of all of the foregoing metal oxides. The catalyst carrier comprises a metal oxide selected from the group consisting of aluminum oxide, magnesium oxide, silicon oxide, zirconium oxide and/or titanium oxide. The catalyst carrier may comprise a mixture of all of the foregoing oxides or a mixture of any combination of the foregoing oxides. Preferably, the carrier comprises one or more porous sintered blocks on which the carrier has been impregnated.

DETAILED DESCRIPTION

Figure 1:
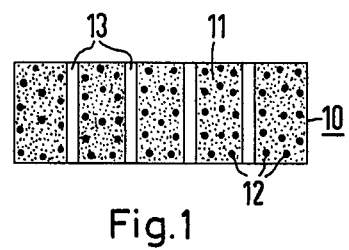
FIG. 1 is a simplified illustration of a catalyst carrier in the form of sintered blocks, in which the catalyst has been impregnated.

The following detailed description contains a description of the composition of the catalytically active substance, the production of the catalytically active substance and an apparatus for using the catalytically active substance of this invention.

Composition of the Catalytically Active Substance

The catalytically active substance of this invention for the conversion of higher hydrocarbons into gas mixtures, such as gas mixtures containing carbon monoxide, methane and/or hydrogen, comprises: a catalyst comprising oxides of the metals lanthanum, cobalt, nickel and uranium; and an oxidic catalyst carrier for this catalyst.

The catalyst carrier for the catalytically active substance of this invention comprises at least one metal oxide selected from the group consisting of aluminum oxide $Al_2O_3$ (such as alpha-$Al_2O_3$); magnesium oxide MgO, silicon oxide $SiO_2$; zirconium oxide $ZrO_2$ and/or titanium oxide $TiO_2$. The catalyst carrier may comprise a mixture of all of the foregoing oxides or a mixture of any combination of the foregoing oxides or any one of the foregoing oxides.

It has been found particularly advantageous to use aluminum oxide (preferably alpha-$Al_2O_3$) and magnesium oxide as the catalyst carrier. These two oxides, at least in part, are present in the form of a double oxide $MgO \cdot Al_2O_3$ in the form of spinel, which may be used for the catalyst carrier.

When the catalyst carrier comprises a mixture of magnesium oxide and aluminum oxide, the magnesium oxide content is preferably 1% to 50% by weight and the aluminum oxide content is preferably 50% to 99% by weight. It has been found more preferable for such catalyst carrier to comprise 10% to 30% by weight of magnesium oxide and 70% to 90% by weight of aluminum oxide. It has been found particularly advantageous to use a catalyst carrier which comprises approximately 15% by weight of magnesium oxide MgO and approximately 85% by weight of aluminum oxide $Al_2O_3$.

The grain size of the aluminum oxide used for the catalyst carrier advantageously is less than 50 microns and, preferably, within the range from 2 to 4 microns. The magnesium oxide used as an initial material for the catalyst carrier advantageously has a grain size of less than 100 microns. All or, preferably, 30% to 40% by weight of the magnesium oxide has a grain size between 40 and 60 microns. It is advantageous for the grain size of the magnesium oxide used as an initial material for the catalyst carrier to be larger than the grain size of the aluminum oxide used as an initial material.

It is advantageous for the catalyst to contain in the forme of oxides 55% to 92% by weight of lanthanum, 2% to 30% by weight of cobalt, 1% to 10% by weight of nickel, and 0.1% to 8% by weight of uranium, in each case relative to the total metal content of the catalyst. Preferably, the catalyst contains 65% to 78% by weight of lanthanum, 15% to 25% by weight of cobalt, 2% to 6% by weight of nickel and 1% to 2% by weight of uranium.

The catalyst for the catalytically active substance may also contain lanthancobaltite $LaCoO_3$ doped with nickel oxide and uranium oxide. This lanthancobaltite contains approximately 70% by weight of lanthanum and about 30% by weight of cobalt, relative to the metal content. The nickel content of this catalyst is 1% to 10% by weight and the uranium content is 0.1% to 8% by weight, relative to the total metal content of the catalyst.

It is particularly advantageous for the catalyst to contain more lanthanum than the stochiometric compound lanthancobaltite $LaCoO_3$. Such a catalyst preferably comprises approximately 70.6% by weight of lanthanum, approximately 24.6% by weight of cobalt, approximately 3.0% by weight of nickel and approximately 1.8% by weight of uranium, relative to the total metal content of the catalyst.

The catalytically active substance of this invention may contain 0.1% to 13% by weight of catalyst relative to the weight of the catalyst carrier. Preferably, the catalytically active substance contains 5% to 9% by weight of catalyst relative to the weight of the catalyst carrier. Still more preferably, the weight of the catalyst is approximately 8% relative to the weight of the catalyst carrier.

The catalyst carrier preferably consists of porous material. The metal oxides for the catalyst carrier, such as $Al_2O_3$ and MgO, are in the form of a sintered ceramic material, that is, in the form of a sintered block. The catalyst carrier has a porosity of 20% to 60% by volume and, preferably, about 40% to 45% by volume of the material. The material is mainly openpored. The porosity of the material is advantageous because it provides good heat stability.

The catalyst carrier consists of at least one and, preferably, a plurality of sintered blocks, having pores and having channels. The sintered blocks are made in the form of plates. The channels are close together and run approximately parallel to one another. The channels run completely through the sintered block, that is, from one surface of the sintered block to the opposite surface. The channels serve for the passage of the mixture of hydrocarbons and oxygen, or oxygen-containing compounds and/or the gas mixtures formed from them which contain CO, $CH_4$ and/or $H_2$. The use of catalyst carriers having channels provides the advantage that pressure losses can be kept low.

The preponderance of catalyst material is located in the porous surfaces of the catalyst carrier and in the porous areas that surround the channels, so that complete conversion of the hydrocarbons can be achieved. It has also been found that the channels in the catalyst carrier may be relatively short, i.e., the catalyst carriers may be relatively thin when the gas mixture entering the catalyst carrier has a turbulent flow. The channels may be 5 to 10 mm long.

The sintered blocks of the catalyst carrier have approximately 10 to 70 channels per $cm^2$ of the sintered block and, preferably, 40 to 60 channels per $cm^2$ of sintered block. The diameter of the channels is approximately 0.8 to 2.0 mm and, preferably, 0.8 to 1.3 mm. The channels may have a diameter of less than 0.8 mm, but the lower limit of the channel diameter is limited by production technology factors. The number of channels per $cm^2$ and the diameter of the channel is chosen so that complete conversion of the hydrocarbons can be achieved, together with good thermal and mechanical stability of the catalyst carrier.

In one embodiment, a sintered block has dimensions of 46 mm × 66 mm × 14 mm. The side faces, having the dimensions of 46 mm × 66 mm, are provided with about 1,200 channels, each having a diameter of 1.1 mm and a length of 14 mm. Thus, in this embodiment, each $cm^2$ of the large surface of the sintered block has 40 channels. Such a sintered block weighs approximately 50 g.

The catalyst carrier should consist of pure materials. The aluminum oxide, particularly in the form of alpha-$Al_2O_3$, should at least be 95% pure. The magnesium oxide should have a corresponding degree of purity. The initial material of the catalyst carrier should have less than 0.2% by weight of alkali-metal oxide. The silicon oxide $SiO_2$ content of the $Al_2O_3$ and the MgO should not exceed about 2% by weight.

The catalytically active substance of this invention has great activity for the conversion of hydrocarbon/oxygen mixtures into gas mixtures containing carbon monoxide, methane and/or hydrogen. The oxygen of the hydrocarbon/oxygen mixture may be in the form of air, or carbon dioxide or water vapor. The catalytically active substance has long life and can be used under conditions of rapid and frequent changes in temperature. The catalytically active substance of this invention can be used in operation in an oxidizing atmosphere or in a reducing atmosphere.

The great activity of this catalytically active substance can be used through a wide range of temperatures, from approximately 200°C. to 900°C. By using this catalytically active substance, an increase in reaction speed by a factor of approximately 10 is obtained, in comparison with conventional catalysts.

The advantages of this catalytically active substance result from its composition. The advantages may be ascribed to the reciprocal action between the catalyst carrier and the catalyst. The catalyst, at least in part, is incorporated in the structure of the carrier, which itself can have a certain catalytic activity. For example, lanthanum oxide and nickel oxide can be partly incorporated in a spinel matrix. Cobalt oxide, on the other hand, is preferably located at the active centers of the catalyst carrier. Magnesium oxide exerts a stabilizing effect when added to aluminum oxide. Uranium oxide prevents the catalytically active substance from being deactivated through thermal defusion. Otherwise, it is possible for a coherent layer of cobalt to form on one side of the catalytically active substance because of a temperature gradient in the catalytically active substance and cause deactivation. Uranium oxide also accelerates the conversion reaction, particularly in the initial phase of the reaction.

Production of the Catalytically Active Substance

In order to produce the catalytically active substance of this invention, one may use the process which is disclosed in German patent application No. P 22 10 418.7, entitled, "Highly Porous and Gas-Permeable Ceramic Carriers, Particularly for Catalysts, and a Process for Producing Them."

In order to produce the catalyst carrier, an oxidic basic substance is put into a press mold along with filler substances that volatize at elevated temperature. The oxidic basic substance and filler substances are compressed into a molded substance which is then subjected to a firing process. The catalyst carrier obtained in this manner is then impregnated with a solution containing a lanthanum salt, a cobalt salt, a nickel salt and a uranium salt. The impregnated carrier is dried and finally the metallic salts are decomposed by heat.

Preferably, the catalyst carrier for the catalytically active substance is prepared in such a way that the alpha aluminum oxide and the magnesium oxide are mixed together, along with water, die-oil, graphite and/or carbon black, and organic thermally-disintegratable polymers. This mixture is compressed in a press mold into a molded object, a sintered block. The molded object is fired at a temperature between 1,350°C. and 1,700°C. to produce the catalyst carrier. This catalyst carrier is then impregnated with an aqueous solution of lanthanum nitrate, cobalt nitrate, nickel nitrate and uranium nitrate. Then, the impregnated carrier is dried at a temperature of about 100°C. Finally, the metallic nitrates are decomposed by heating at a temperature of about 700°C. to 900°C. It is advantageous to heat at the foregoing temperatures because at lower temperatures it is possible to obtain catalytically active substances that are hygroscopic and, as a result, can be altered in the atmosphere.

The filling substances in the mold may be inorganic or organic fillers. They are removed from the catalyst carrier during the firing process in form of gases. The filling substances serve the dual purpose of producing a crumbly plastic processing mass and of producing pores in the catalyst carrier. In particular, graphite or carbon black, die-oil and organic polymers that can be disintegrated by heat may be used as fillers. The following organic polymers are preferable: polyvinylacetal, polyvinylalcohol, polyglycols, or cellulose derivatives such as methyl cellulose and ethyl cellulose, and also methylhydroxyethyl cellulose. The term "die-oil" refers to a machine oil of great purity.

The firing process is preferably done at a temperature of about 1,400°C. to 1,420°C., particularly where aluminum oxide and magnesium oxide are used for the catalyst carriers. Such catalyst carriers have great porosity, great mechanical strength and good stability under fluctuating temperatures.

The metal used for the catalyst, lanthanum La, cobalt Co, nickel Ni and uranium U, can advantageously be used in the form of their metal nitrates. Other soluble metal salts may also be used, such as oxalates, acetates, carbonates, and tetramine complexes. These salts are easily decomposed by heat.

The following is a specific example of a process for the production of a catalytically active substance in accordance with this invention. First, 85 g of alpha aluminum oxide (corundum) and 15 g of magnesium oxide are mixed together thoroughly, along with 5 g of die-oil, 3 g of graphite, 3 g of polyvinylacetal (e.g., Mowital), 3 g of water-soluble cellulose ether (e.g., Tylose), 0.5 g of polyvinyl alcohol (e.g., Mowiol), and 20 ml of water. These materials should be mixed for two hours, using a double-shaft mixer, for example. Preferably, the crumbly mass thus obtained is further processed for the purpose of preventing it from drying-out through the escape of the volatile components. If the crumbly mass is not further processed immediately, then it is stored in an airtight container.

Second, the crumbly mass is then processed through a sieve, for example, through a sieve having a mesh width of about 0.05 to 0.1 mm. Third, the portion which has been processed through the sieve is then put into a press mold. The available space in the press mold is larger than the final volume of the pressed product obtained after compression in the press mold. During the pressing operation, the mass is initially compacted between two plates, an upper plate and a lower plate. The ratio of the volume of the mass after compression to the volume of the mass before compression is between 1:1.2 and 1:3. Preferably, this volumetric ratio is about 1:2. The pressure applied is approximately 1 to 3 N/mm$^2$.

Fourth, for the purpose of producing channels in the molded material, pins are run from the upper plate through the compacted mass and into holes in the lower plate. These pins have a diameter of approximately 0.8 to 2.0 mm and, preferably, have a diameter of between approximately 0.8 mm and 1.3 mm. The number of pins and their diameter are chosen so that the cross-sectional area of all the channels produced in the compacted mass amounts to 10% to 70% of the area of the molded mass. Preferably, the channels comprise an area of approximately 35% to 45% of the molded mass.

Fifth, after the pins are introduced into the compacted mass, the pressure is increased again and the mass is given a final compression. The pressure applied for this final compression is between 5 and 50 N/mm$^2$ and preferably amounts to 10 to 20 N/mm$^2$. Still more preferably the pressure amounts approximately to 15 N/mm$^2$.

Sixth, at the end of the pressing operation, that is, after the pressure is removed from the compacted mass, the pins are pulled through the upper plate and are thus pulled out of the formed object. The formed object is then removed from the press mold, dried and then fired. The firing process is conducted at a temperature between 1,350°C. and 1,700°C., and, preferably between 1,400°C. and 1,420°C. The process of heating the formed object to the firing temperature is done in a period of time between 3 and 6 hours, preferably within 4 hours. The duration of the firing process at the firing temperature is approximately between 2 and 6 hours, that is, 6 hours for a firing temperature in the range from 1,350°C. to 1,450°C. and 2 hours for a firing temperature between 1,650°C. and 1,700°C. After firing, the formed object, which is now a sintered block, is allowed to cool, preferably for 2 to 6 hours.

In the production of a catalyst carrier containing aluminum oxide and magnesium oxide, the grain size of the magnesium oxide is preferably greater than the grain size of the aluminum oxide. It is possible to insure that no shrinkage occurs during the firing process and, in addition, that good strength is obtained, by using a mixture of relatively fine $Al_2O_3$ and of relatively coarse MgO. Furthermore, catalytically active substances having such a catalyst carrier exhibit increased activity. It is also preferable in the production of a catalyst carrier containing magnesium oxide and aluminum oxide to use a magnesium oxide that has been melted prior to its use.

The sintered block produced by the foregoing process has a porosity of approximately 20% to 60% by volume. Preferably, this porosity amounts to approximately 40% to 45% by volume. The volume of pores should not exceed an upper limit of about 60% because the sintered block would then have too little strength and heat-conductivity. The volume of pores should not fall below the lower limit of approximately 20% because then too little catalyst material would be contained in the sintered block.

The introduction of the catalyst into the sintered block which acts as a catalyst carrier is done in the following manner: 5.9 g of lanthanum nitrate $La(NO_3)_3 \cdot 6 H_2O$; 3.25 g of cobalt nitrate $Co(NO_3)_2 \cdot 6 H_2O$; 0.4 g nickel nitrate $Ni(NO_3)_2 \cdot 6 H_2O$; and 0.1 g of uranyl nitrate $UO_2(NO_3)_2 \cdot 6 H_2O$ are heated briefly to about 90°C. in 4 ml of distilled water to dissolve them. This solution is then cooled to about 50°C. and is used to impregnate a sintered block having a weight of about 50 g. After drying for about 1 hour at a temperature of about 100°C., the sintered block containing the metallic nitrates is heated for about 2 hours at a temperature ranging from approximately 700°C. to 900°C. As a result, the metallic nitrates become decomposed and converted into oxides. The catalytically active substance produced in this manner contains, in the form of oxides, approximately the following quantities of metals: 70.6% by weight of lanthanum, 24.6% by weight of cobalt, 3.0% by weight of nickel, and 1.8% by weight of uranium, relative to the metal content.

Following the decomposition of the metallic salts, the sintered block can then be heated in a reducing atmosphere, such as hydrogen. A catalytically active substance produced in this manner provides the advantage of reducing the starting time and the starting temperature of the conversion reaction to be carried out by the catalytically active substance when first in use.

The introduction of the catalyst into the sintered block which acts as a catalyst carrier can also be done in such a way that the individual components are applied in different stages. For example, after the sintered block has been fired, it can be impregnated with an aqueous solution of lanthanum nitrate. Then, the sintered block is dried and heated in air to approximately 850°C. to 900°C. Following this, the sintered block is impregnated with an aqueous solution of salts of the remaining metals and is further treated in the manner previously described.

Referring to FIG. 1, the sintered block 10 which acts as a catalyst carrier for this invention consists of porous sintered material 11. The sintered block 10 contains catalyst material 12. In addition to the existing pores, the sintered block 10 is provided with channels 13 which run parallel to one another and pass through the block 10 from one surface to the other. The catalyst material 12 is situated mainly in the porous surfaces of the sintered block and also in those porous regions that surround the channels 13.

Apparatus for Using the Catalytically Active Substance

Figure 2:
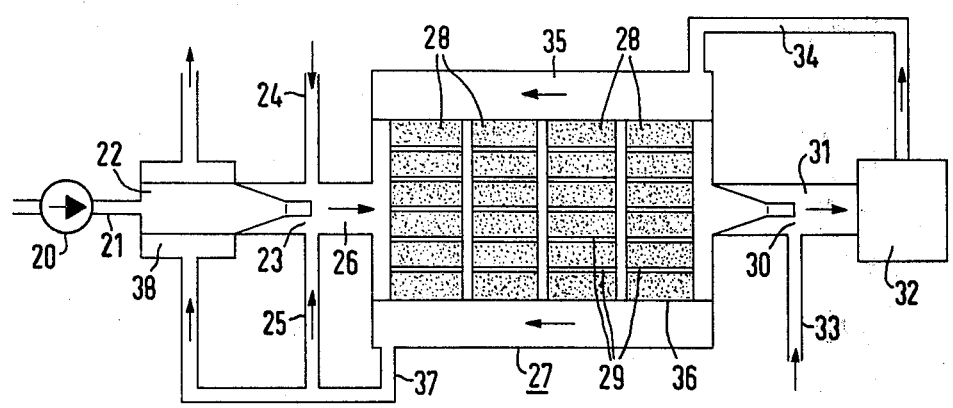
FIG. 2 is a diagram of an apparatus for using the catalytically active substance of this invention.

Referring to FIG. 2, the following is a description of an apparatus for using the catalytically active substance of this invention to produce a combustible gas for an engine from a hydrocarbon/oxygen mixture. The fuel, such as benzine or gasoline, is pumped by means of a pump 20 through a tubular conduit 21 into a carburetor 22 where the fuel is evaporated. There is a mixing nozzle 23 at the carburetor 22 for mixing the evaporated fuel with the oxygen-containing gas.

The mixing nozzle 23 can be supplied with air through pipe 24. The mixing nozzle 23 can also be supplied with exhaust gas through pipe 25 from the engine. The exhaust gas contains oxygen in the form of $CO_2$ and $H_2O$. The mixture of evaporated fuel and oxygen-containing gas is conveyed at a temperature of about 50°C., for example, through pipe 26 to cracking carburetor 27.

Cracking carburetor 27 is the apparatus in which the fuel is converted into combustible gas. The catalytically active substances 28 of this invention, in the form of sintered blocks for example, are disposed in cracking carburetor 27. The sintered blocks have channels 29. The cracked gas leaves cracking carburetor 27 through mixing nozzle 30 positioned at the outflow of cracking carburetor 27. At this point the cracked gas contains some carbon dioxide, nitrogen, carbon monoxide, hydrogen, methane and, occasionally, higher hydrocarbons. The cracked gas is conducted through pipe 31 to an engine 32, such as the engine of an automobile.

The mixing nozzle 30 can be supplied with fresh air through pipe 33. This fresh air is mixed with the cracked gas before it enters engine 32. The cracked gas is burned with the fresh air in engine 32. The exhaust gas formed as a result of combustion in engine 32 is conducted out of the engine through pipe 34 into heat exchanger 35 which is a component of carburetor 27 and surrounds the space 36 in which the catalytically active substance 28 is located.

The exhaust gas leaves the heat exchanger 35 through pipe 37. Part of the exhaust gas can be conducted through pipe 25 to mixing nozzle 23. But, a greater quantity of the exhaust gas is conducted into heat exchanger 38 which is attached to carburetor 22. In heat exchanger 35, the heat content of the exhaust gas is used to keep the catalytically active substance at the desired temperature. In heat exchanger 38, the heat content of the exhaust gas is used to evaporate the fuel and to heat this evaporated fuel. Optionally, a heat exchanger (not shown) may be provided in pipe 31 to cool the hot cracked gas. The thermal energy derived by this heat exchanger (not shown) from the hot cracked gas may be transmitted in part to the fuel that is initially used and/or to the oxygen-containing oxidation medium.

As an example, the sintered blocks disposed in the cracking carburetor 27 each contain about 8% by weight of catalyst, in the form of lanthanum oxide, cobalt oxide, nickel oxide and uranium oxide, relative to the weight of the sintered block. The sintered blocks have the following dimensions: 46 mm × 66 mm × 14 mm. They are arranged parallel to one another with a spacing of about 5 mm.

The gasoline/air mixture is conducted to the catalytically active substance in the cracking carburetor 27 at a temperature of 50°C., for example. In this embodiment, the gasoline used has a composition corresponding to the average form of $C_8H_{16}$. The temperature at the catalytically active substance is 780°C. to 840°C. The cracked gas leaves the cracking carburetor 27 at a temperature of about 600°C.

At uniform temperature, the rate of gasoline conversion in the cracking carburetor is dependent upon the load on the catalytically active substance. If this load, under the foregoing conditions, amounts to about 60 $cm^3$ of gasoline per hour per $cm^2$ of sintered block surface, then the gasoline will be converted completely into cracked gas. As a result, 0.27 $cm^3$ of cracked gas is obtained per hour per $cm^2$ of sintered block surface. The gas composition is approximately as follows: 19.5% by volume of CO; 2.0% by volume of $CH_4$; 20.0% by volume of $H_2$; 3.8% by volume of $CO_2$; the remainder being $N_2$. This nitrogen comes from the air.

With a load of about 85 $cm^3$ of gasoline per hour per $cm^2$ of sintered block surface, only about 80% of the original gasoline is converted. Approximately 0.29 $cm^3$ of cracked gas is obtained per hour per $cm^2$ of sintered block surface. The cracked gas has approximately the following composition: 19.0% by volume of CO; 2.2% by volume of $CH_4$; 19.0% by volume of $H_2$; 4.2% by volume of $CO_2$; the remainder being $N_2$ and gasoline vapor, as well as hydrocarbons ranging from $C_2H_6$ (ethane) and formed through the partial conversion of the gasoline.

With a load of about 124 $cm^3$ of gasoline per hour per $cm^2$ of sintered block surface, only about 65% of the gasoline is converted. Approximately 0.34 $m^3$ of cracked gas is obtained per hour per $cm^2$ of sintered block. This cracked gas has a content of 16.1% of CO by volume; 2.5% of $CH_4$ by volume; 15.5% of $H_2$ by volume; 5.0% of $CO_2$ by volume; the remainder being $N_2$ and gasoline vapor, as well as hydrocarbons ranging from $C_2H_6$ (ethane) and formed through the partial conversion of the gasoline.

By use of the catalytically active substance of this invention in a cracking carburetor such as that shown in FIG. 2, it is possible to produce a combustible gas from a low-octane fuel that allows knock-free operation of a combustion engine. The cracking carburetor 27 has been described in detail in German patent application No. P 21 35 650.3. It has also been possible by use of this combustible gas to lower the emission of noxious substances considerably in the exhaust gas, as compared with the exhaust gas of conventional gasoline engines. When an automobile is operated by use of the combustible gas produced from a cracking carburetor using the catalytically active substance of this invention, the amounts of carbon monoxide and nitric oxide in the exhaust gas are considerably lower than the amounts in the exhaust gas of the same engine when using gasoline. No decrease in performance has been observed and the fuel consumption can even be lowered somewhat.

In addition to using the catalytically active substance of this invention in conjunction with an automobile engine, there are other possibilities for the use of this catalytically active substance. For example, it can be used for the production of a hydrogen-containing gas mixture for use in fuel cells. It can also be used to form methane, in particular at temperatures between approximately 300°C. and 500°C. At temperatures in the range from approximately 600°C. to 800°C. the catalytically active substance of this invention can be used for the production of gas mixtures containing hydrogen and carbon monoxide obtained from methane. It can be used for the after-burning of exhaust gases from conventionally operated automobiles. Finally, the catalytically active substance of this invention can be used in radiation burners, such as power plant burners, in a process described in German Exhibited Text DOS 1,939,535.

What is claimed is:

1. A catalytically active substance for the conversion of higher hydrocarbons into gas mixtures, containing carbon monoxide, methane and/or hydrogen, comprising:

a catalyst comprising oxides of the metals lanthanum, cobalt, nickel and uranium in the proportions 55% to 92% by weight of lanthanum, 2% to 30% by weight of cobalt, 1% to 10% by weight of nickel, and 0.1% to 8% by weight of uranium, in each case relative to total metal content of the catalyst; and an oxide catalyst carrier for said catalyst.

2. The catalytically active substance according to claim 1 wherein said catalyst carrier comprises at least one metal oxide selected from the group consisting of aluminum oxide, magnesium oxide, silicon oxide, zirconium oxide and titanium oxide.

3. The catalytically active substance according to claim 2 wherein said metal oxide for said catalyst carrier is aluminum oxide.

4. The catalytically active substance according to claim 2 wherein said metal oxide for said catalyst carrier is alpha-$Al_2O_3$.

5. The catalytically active substance according to claim 2 wherein said metal oxide for said catalyst carrier is magnesium oxide.

6. The catalytically active substance according to claim 2 wherein said metal oxide for said catalyst carrier is zirconium oxide.

7. The catalytically active substance according to claim 2 wherein said metal oxide for said catalyst carrier is titanium oxide.

8. The catalytically active substance according to claim 2 wherein said metal oxide for said catalyst carrier is silicon oxide.

9. The catalytically active substance according to claim 2 wherein said catalyst carrier comprises aluminum oxide and magnesium oxide.

10. The catalytically active substance according to claim 1 wherein the catalyst carrier comprises MgO . $Al_2O_3$ in the form of spinel.

11. The catalytically active substance according to claim 1 wherein said catalyst carrier comprises aluminum oxide, magnesium oxide, silicon oxide, zirconium oxide and titanium oxide.

12. The catalytically active substance according to claim 2 wherein the catalyst carrier comprises 1% to 50% by weight of magnesium oxide and 50% to 99% by weight of aluminum oxide.

13. The catalytically active substance according to claim 1 wherein said catalyst carrier comprises 10% to 30% by weight of magnesium oxide and 70% to 90% by weight of aluminum oxide.

14. The catalytically active substance according to claim 1 wherein said catalyst carrier comprises approximately 15% by weight of magnesium oxide and approximately 85% by weight of aluminum oxide.

15. The catalytically active substance according to claim 3 wherein said aluminum oxide for said catalyst carrier has a grain size of less than 50 microns.

16. The catalytically active substance according to claim 3 wherein said aluminum oxide for said catalyst carrier has a grain size within the range from 2 to 4 microns.

17. The catalytically active substance according to claim 5 wherein said magnesium oxide used as an initial material for said catalyst carrier has a grain size of less than 100 microns.

18. The catalytically active substance according to claim 5 wherein the magnesium oxide used as an initial material for said catalyst carrier has a grain size within the range from 40 microns to 60 microns.

19. The catalytically active substance according to claim 5 wherein 30% to 40% by weight of the magnesium oxide used as an initial material for said catalyst carrier has a grain size between 40 and 60 microns.

20. The catalytically active substance according to claim 9 wherein the magnesium oxide used as an initial material for said catalyst carrier has a grain size larger than the grain size of the aluminium oxide used as an initial material.

21. The catalytically active substance according to claim 1 wherein said catalyst comprises: 65% to 78% by weight of lanthanum, 15% to 25% by weight of cobalt, 2% to 6% by weight of nickel, and 1% to 2% by weight of uranium.

22. The catalytically active substance according to claim 1 wherein said catalyst comprises lanthancobaltite doped with nickel oxide and uranium oxide.

23. The catalytically active substance according to claim 22 wherein said lanthancobaltite comprises approximately 70% by weight of lanthanum and about 30% by weight of cobalt, relative to the metal content of the lanthancobaltite.

24. The catalytically active substance according to claim 22 wherein the nickel content is approximately 1% to 10% by weight and the uranium content is 0.1% to 8% by weight, relative to the total metal content of the catalyst.

25. The catalytically active substance according to claim 1 wherein said catalyst contains more lanthanum than the stochiometric compound lanthancobaltite.

26. The catalytically active substance according to claim 1 wherein said catalyst comprises: approximately 70.6% by weight of lanthanum, approximately 24.6% by weight of cobalt, approximately 3.0% by weight of nickel, and approximately 1.8% by weight of uranium.

27. The catalytically active substance according to claim 1 comprising 0.1% to 13% by weight of catalyst relative to the catalyst carrier.

28. The catalytically active substance according to claim 1 comprising 5% to 9% by weight of catalyst relative to the catalyst carrier.

29. The catalytically active substance according to claim 1 comprising approximately 8% by weight of catalyst relative to the catalyst carrier.

30. The catalytically active substance according to claim 1 wherein said catalyst carrier consists of a porous material.

31. The catalytically active substance according to claim 1 wherein said catalyst carrier has a porosity of 20% to 60% by volume.

32. The catalytically active substance according to claim 1 wherein said catalyst carrier has a porosity of 40% to 45% by volume.

33. The catalytically active substance according to claim 1 wherein the catalyst carrier comprises at least one sintered block, having pores and having channels, said channels being approximately parallel to one another.

34. The catalytically active substance according to claim 33 wherein the catalyst carrier comprises a plurality of sintered blocks.

35. The catalytically active substance according to claim 33 wherein said sintered block has approximately 10 to 70 channels per square centimeter.

36. The catalytically active substance according to claim 33 wherein said sintered block has approximately 40 to 60 channels per square centimeter.

37. The catalytically active substance according to claim 33 wherein the diameter of said channels is approximately 0.8 to 2.0 millimeters.

38. The catalytically active substance according to claim 33 wherein the diameter of the channels is approximately 0.8 to 1.3 millimeters.

* * * * *